Sept. 16, 1952 — L. BETZ — 2,610,987
BATTERY AND CABLE CARRIER
Filed May 8, 1951
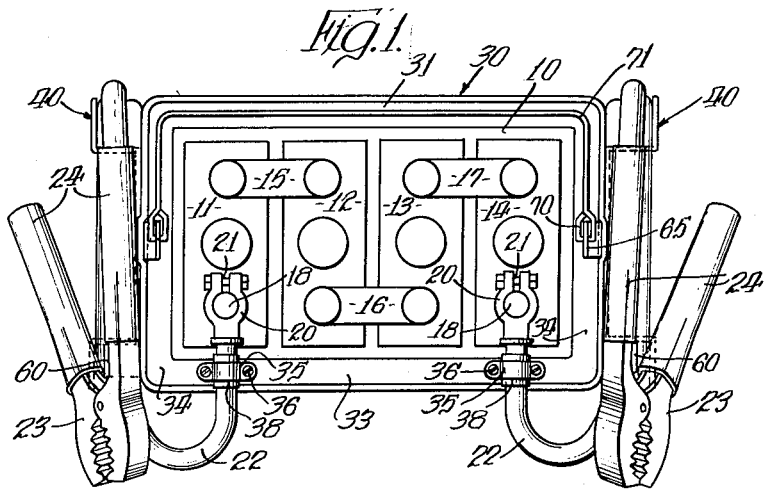
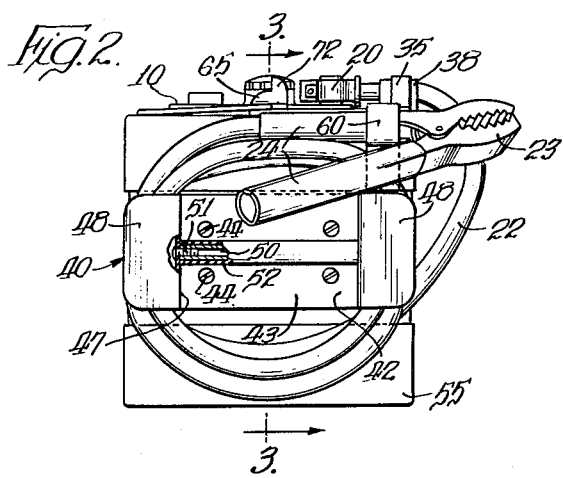
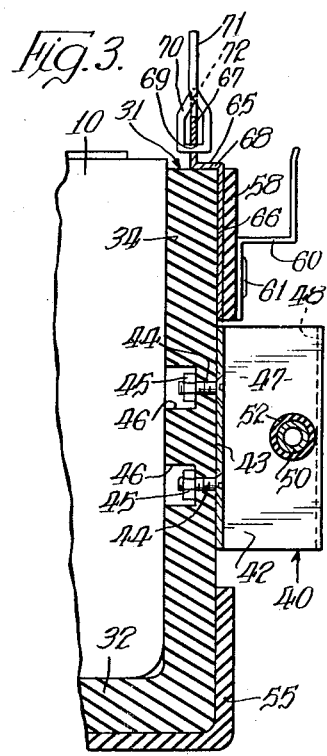
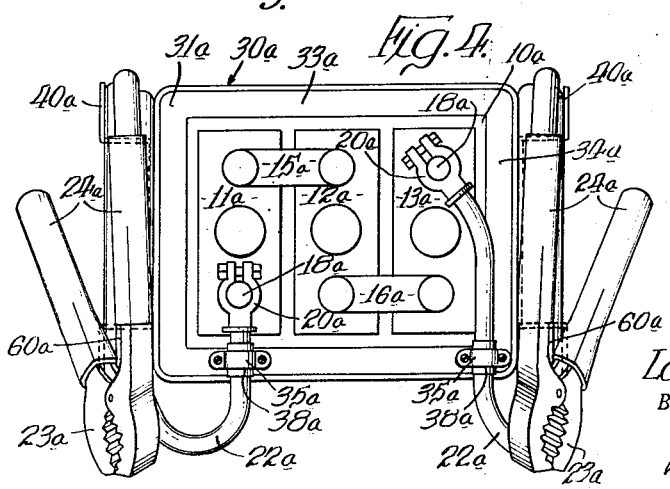
INVENTOR.
Lawrence Betz
BY Brown, Jackson,
Boettcher & Dienner
Attys.

Patented Sept. 16, 1952

2,610,987

UNITED STATES PATENT OFFICE 2,610,987

BATTERY AND CABLE CARRIER

Lawrence Betz, Chicago, Ill.

Application May 8, 1951, Serial No. 225,148

14 Claims. (Cl. 136—181)

The present invention relates to a battery and cable carrier, and more particularly, to a carrying case for a wet cell battery and the cable leads secured to the terminals of the battery.

Storage batteries employed as a portable source of electrical energy are not provided with handles or any like means for picking up and transporting the battery. The batteries are heavy and difficult to handle, particularly in view of the fact that if they are tipped or tilted, the liquid in the batteries may spill out. In view of these factors, there has been a decided need for a carrier for batteries utilized as a portable source of electrical energy.

Batteries, when used as a portable source of electrical energy, have cables connected to their terminals. The terminals are usually rubber sheathed and tend to assume their full length and drag along behind when the battery is being transported, and therefore are difficult to handle. The cables may be stepped upon, resulting in damage, particularly to the clamping jaws at the free ends of the cables, and the cables may be jerked loose from the battery terminals. Occasionally, the clamps at the free ends of the cables will contact each other and establish a short circuit.

It is, accordingly, a primary object of the present invention to provide a carrier for a battery and its associated cables to provide a convenient means for lifting and transporting the battery and also the cables associated therewith in a safe, compact and convenient manner. With the carrier of the present invention, the cables need not be disconnected from the terminals as a safety precaution since they are maintained in separated positions. Consequently, they together with the battery, are ready for use and transportation at any moment.

One common use of portable storage batteries is as a temporary booster source of electrical energy for use in starting vehicle engines. In cold weather, vehicle engines and the batteries forming the source of electrical energy for the electrical system of the vehicle, approach ambient temperature if left to stand exposed to the elements in a non-operating condition for periods of time. When the engine is cold, the lubricants therein add increased resistance to movement of the engine parts, and accordingly place a heavier load on the starting motor of the vehicle engine. When the battery is cold, its electrical output is greatly reduced from that which it would have if warm, and, accordingly, the battery is not able to supply sufficient current to the starting motor to enable the starting motor to turn the engine over. When such situations occur, it is common to call a service station and have an attendant bring a storage battery, commonly referred to as a "booster battery," to the location of the car. The terminals of the booster battery are then connected to the terminals of the vehicle battery to supply sufficient current to the starter motor to start the vehicle engine. When the vehicle engine is started, the booster battery can be disassociated from the vehicle battery and the engine will continue to operate. In a single instance of such use, the booster battery must be taken from the service station, placed upon a truck, transported to the location of the stalled vehicle, lifted off the truck, placed on the fender of the stalled vehicle or on the ground, later removed from the vehicle or the ground, placed back on the truck, transported back to the service station, removed from the truck and placed in the service station. During such use, the battery must be lifted and set down very frequently. Due to its heaviness and the awkward way in which it must be handled, it is very difficult to set the battery down lightly without tilting same. As previously stated, if the battery is tilted, the acid runs out and the battery becomes useless. If the battery is dropped or set down without sufficient care, the casing of the battery may crack, thus ruining the battery. It is common practice to connect long lengths of cable leads to the terminals of the booster battery for connection to the terminals of the vehicle battery, and in transporting the booster battery these cables may become entangled or may be stepped on or the like. It is thus seen that a carrier or carrying case for a booster battery of this type would be of great utility and importance.

In accordance with the previously stated object of the invention, the carrier of the present invention comprises a box or casing adapted to conformably receive a battery, the casing being provided with carrying handles about which the individual cable leads may be wrapped. The carrier is preferably formed of an insulating material which is rigid and adapted to completely support a battery. To prevent undue shock and the like, which would be likely to result in the cracking of the battery casing, cushion members are provided on the carrier to yieldably absorb any blow to which the carrier and the battery therein are subjected.

Another object of the invention is the provision of alternate carrying means or handles for the carrier, which render the carrier and battery transportable in any one of a plurality of alternate manners.

A further object of the invention is to provide means for guiding the cables which are connected with the battery terminals and for preventing excessive flexing of the cables when they are connected to the terminals. By such means, breakage of the cables adjacent the terminals is prevented. The guide means also assist in directing the cables most suitably for coiling them on the retaining means which are provided by the handles of the casing or carrier. In the preferred form of the present invention, the guide means are adjustable to different positions with respect to the casing or carrier in order to permit the guide means to be most appropriately positioned for the terminals of the particular battery received in the carrier.

A still further object of the invention is to provide retaining means for the free terminals of the cable leads to prevent unwinding of the cables from the handles about which they are coiled.

The various objects and advantages of the present invention will become apparent in the following detailed description of preferred embodiments of the present invention, reference being made in the following description to the accompanying drawings, in which:

Figure 1 is a plan view of a portable four cell storage battery having cables connected to the terminals thereof, the battery being mounted in the carrier of the present invention and the cables being coiled upon the cable retaining means of the carrier;

Figure 2, an end elevation taken from the left end of Figure 1;

Figure 3, a fragmentary cross sectional view taken on the line 3—3 of Figure 2; and Figure 4, a plan view of a portable three cell storage battery having cables connected to the terminals thereof, with the battery mounted in the carrier of the present invention and the cables coiled about the cable retaining means of the carrier.

The carrier shown in Figure 1 is particularly adapted for transporting a wet cell storage battery 10 having four cells 11, 12, 13 and 14, interconnected by bus bars 15, 16 and 17, the end cells having terminals 18 in the form of smooth surfaced, tapered studs. Terminal clamps 20 are detachably secured to the terminals 18 by means of bolts 21. Elongate lengths of rubber encased cable 22 are secured to the terminal clamps 20 in a usual manner, as by soldering, and terminate at their free ends in pliers-type clamps 23. The handles of the pliers-type clamps 23 are encased in rubber sleeves 24 which insulate the clamps from the hands of a user and also cover and enclose the connection between the cables 22 and the clamps 23.

As seen from the drawing, the battery of itself is not provided with any means for carrying or transporting the battery, accordingly, it must ordinarily be grasped by its bottom edges, which is a difficult and awkward way of carrying as heavy an item as a battery. In addition, there is every possibility of tilting the battery or of setting the battery down with too much force which results in the spilling of the battery acid or the cracking of the battery case. The case of the battery is hard and when the battery is placed upon or moved along a surface, the surface is marred or the battery case is marred or cracked. This is a particularly disadvantageous feature when the battery must be placed upon the fender of a vehicle when the battery is being used as a booster battery. In order to obviate all of these disadvantages, the present invention provides a carrier for the battery provided with handles which facilitate the easy transportation and carrying of the battery and also provides cushioning means to prevent the transmission of shock to the battery case and to prevent the scratching and marring of surfaces upon which the battery may be placed.

The carrier of the present invention is indicated generally by the reference numeral 30 and comprises a box 31 having a bottom 32, vertical side walls 33 and vertical end walls 34. The box is open at its top end for the reception of the battery. Accordingly, the upper surfaces of the side and end walls terminate adjacent the top of the battery, and preferably slightly below the upper surface of the battery to be received within the box. The box is of a size and shape to conformably receive the battery so that same is stationarily positioned within the box without freedom for lateral movement. The box is preferably formed of wood in any usual manner of wooden construction so as to provide substantial strength for the support and retention of the battery. Any material other than wood may be utilized in the construction of the box, but it is preferred that such materials have the characteristics of substantial strength, substantial rigidity, ability to absorb shock, and ability to provide a certain amount of insulation.

A pair of cable clamps 35 are detachably secured to the upper surface of the walls of the box by screws 36. It is preferred that the clamps 35 be secured to the upper surface of one of the side walls in alignment with the battery terminals 18, substantially as shown in Figure 1, but may be secured to the upper surface of any of the walls as desired in any particular installation. A cushioning and insulating piece of material, such as rubber, may be positioned between each of the clamps 35 and the upper surface of the box to provide a resiliency of mounting for the cable clamps 35. The cable clamps 35 are preferably aligned with the terminal clamps 20 so that the cables 22 pass in a straight line from the terminals 20 through the clamps 35. The cables are surrounded by a grommet tube 38 at the portion thereof passing through the clamps 35 to provide improved insulation, resiliency of connection and increased resistance to wear. The clamps 35 serve to prevent flexation of the cables 22 at the point of their connection to the terminal clamps 20, which is a point of usual failure or breaking of the cables 22.

Fixedly secured to each end wall 34, at substantially the mid-point thereof, is a combined handle and cable carrier 40. The handle and cable carrier 40 is formed of a unitary sheet 42, comprising a base 43 secured to the end wall 34 by means of bolts 44 and nuts 45, as shown in Figure 3. The end walls of the box are preferably provided with recesses 46 in their inner surfaces for the reception of the bolts 44 and nuts 45. Extending normally to the base 43 at either end thereof are transverse walls 47, which terminate in walls or flanges 48 that are parallel to but longitudinally and transversely spaced from the base 43. The flanges 48, in conjunction with the transverse walls 47, serve as a retaining means for the cables 22, the cables being coiled around the transverse walls 47 and being confined between the flanges 48 and the exterior surfaces of the end walls 34 of the box 31. The carrying handle portion of the member 40 consists of a tube or pipe 50 extending between the transverse walls 47 and connected thereto by means of bolts 51 which extend through the walls 47 and into internal threads in the pipe or tube 50. A rubber insulating and cushioning tube 52 surrounds the pipe 50 to facilitate the handling and carrying of the box.

The detailed description thus far sets forth the essential features of the present invention, consisting of a box adapted to conformably receive a battery, handles to facilitate the carrying and handling of the box and the battery therein and retaining means for the reception of the cables in coiled condition. The features of the invention to be pointed out hereinafter are extremely advantageous and should be utilized, but do not constitute essential characteristics of a battery and cable carrier.

Referring particularly to Figure 3, the bottom 32, the lower portions of the side walls 33 and the lower portions of the end walls 34 of the box 31 are encased in a cushioning substance 55, such as rubber, which provides means for absorbing shock and insulating the carrier. The cushion bottom 55, in addition to its shock absorbing quality, also serves to protect the surfaces upon which the battery carrier and battery may be positioned. The cushion bottom 55 may be formed integrally as shown in Figure 3, or may consist of several pieces, such as, one piece bottom and a strip extending around side walls and end walls of the box, or a bottom consisting of several pieces with a strip extending around the side and end walls of the box. A similar cushion 58 is provided around the top portions of the side and end walls. This cushion need not be as thick as the cushion bottom 55 since the shock applied to the upper surfaces of the carrier is not as great as that applied to the lower surfaces.

A bracket 60 is secured to each end wall 34 of the box 31 by means of a rivet, screw or bolt 61. The bracket is insulated from the box by means of the cushion 58 upon which the bracket 60 is mounted. The bracket 60 serves to receive and retain the pliers-type clamps 23 at the free ends of the cables. One handle of the clamps 23 may be inserted within the bracket 60 as shown in Figures 1 and 2, or the clamping jaws of the clamps 23 may be clamped around the upstanding free end of the bracket 60 to retain the clamps in position against the end walls 34 of the box 31. The retention of the clamps 23 by the brackets 60 prevents the uncoiling of cables 22.

Secured to the upper edge of each end wall 34 at substantially the mid-point thereof, is a handle bracket 65 consisting of two parallel spaced portions 66 and 67 and a transverse connecting wall 68. The lower of the two parallel portions 66 is secured to the end wall 34 in any suitable manner and is preferably positioned between the box and the cushion member 58. The transverse portion 68 extends along the upper surface of the end wall and the upper of the parallel portions 67 extends upwardly and is provided with a hole 69 for the reception of a loop 70 provided at the end of a U-shaped handle or bail 71. The bail 71 is mounted in the bracket 65 for pivotal movement from a lowered position in which it engages the upper surfaces of the side and end walls of the box to a raised position in which it serves as a handle for carrying the box and the battery received therein. The bail 71, in its carrying position, extends above and longitudinally of the battery to serve as a handle for carrying the box 31 and the battery 10 should the handles 50 prove awkward or inconvenient in particular instances. The bail 71 is so shaped as to conform to one half of the perimeter of the box, so that same in its lowered position lies along portions of the upper surfaces of the end walls 34 and along the upper surface of one of the side walls 33, as shown in Figure 1. The bail 71 should preferably lie along the side wall opposite that to which the clamps 35 are connected. To insure that this relationship exists, the brackets 65 are provided with limit means or stops in the form of an upstanding portion or lip 72 arranged to engage the loops 70 in the ends of the bail 71 to prevent pivotal movement of the bail toward the side of the box from which the cables extend. As a modified form, the brackets 65 may be formed of a flat sheet and inserted in a slot or hole in the end walls 34 and secured therein by a bolt or the like. The bracket 65 and bail 71 constitute a portion of the preferred embodiment of the present invention, but are not essential to the invention and may be included or left out of the construction as desired.

The four cell battery shown in Figure 1, has its terminals mounted adjacent the same side thereof so that the cables and clamps therefor are conveniently mounted symmetrically on the upper surface of one side wall 33 of the box 31. In Figure 4, there is shown a three cell battery 10a having three wet cells 11a, 12a and 13a interconnected by means of bus bars 15a and 16a, the end cells having terminals 18a. The terminals 18a are positioned on opposite sides of the battery 10a and accordingly certain changes must be made in the positioning of cables 22a and clamps 35a over that shown in Figure 1. A convenient and preferred arrangement is shown in Figure 4, in which the cables are both led from the same side of the carrier. The remainder of the construction shown in Figure 4 is substantially identical to the previously described construction, and parts similar to parts of the previously described embodiment have been indicated by the same reference numeral with the suffix "a." In the embodiment of Figure 4, the brackets 65 and bail 71 have been omitted as being non-essential.

From the foregoing description it will be apparent that the present invention provides a carrier for a battery and its associated cables which facilitates the handling and carrying of the battery. In the present invention, the battery cables are retained upon the carrier in a convenient and compact manner so as not to interfere with the transportation of the battery. The handles provided on the carrier for transporting the battery are conveniently positioned so as to render the battery readily transportable without tilting and without subjecting the battery to undue shock. Should the battery be subjected to shock, however, the carrier of the present invention is provided with cushion means for absorbing the greater portion of the shock to prevent cracking of the battery case. The carrier of the present invention may be readily adapted to batteries of any size and shape.

Various changes or modifications may be made in details of construction and in the materials of construction referred to and described in the foregoing detailed description of a preferred embodiment of the present invention. Such variations, modifications and changes readily suggest themselves to those skilled in the art, and accordingly, I do not wish to limit my invention particularly to the embodiment described hereinbefore, but rather define my invention by the appended claims.

I claim:

1. A battery and cable carrier adapted to receive a battery and the cables connected to the terminals of the battery, comprising an open top box adapted to conformably receive a battery with the upper surface of the battery exposed, a combined handle and cable retaining means secured to each of two opposite walls of said box, and a retaining bracket secured to each of two opposite walls of said box for the reception of the free end of each battery cable.

2. A battery and cable carrier adapted to receive a battery and the cables connected to the terminals of the battery, the battery cables terminating in clamps, comprising an open top box adapted to conformably receive a battery with the upper surface of the battery exposed, a combined handle and cable retaining means secured to each of two opposite walls of said box, and a retaining bracket secured to each of two opposite walls of said box for the reception and retention of the clamps at the ends of the battery cables.

3. A battery and cable carrier adapted to receive a battery and the cable connected to the terminals of the battery, the battery cables terminating in clamps, comprising an open top box adapted to conformably receive a battery with the upper surface of the battery exposed, a combined handle and cable retaining means secured to each end wall of said box, and a retaining bracket secured to each end wall of said box adjacent the upper surface thereof and adjacent said combined handle and cable retaining means for the reception and retention of the clamps at the ends of the battery cables.

4. A battery and cable carrier adapted to receive a battery and the cables connected to the terminals of the battery, comprising an open top box adapted to conformably receive a battery with the upper surface of the battery exposed, a combined handle and cable retaining means secured to each of two opposite walls of said box, handle brackets secured to each of two opposite walls of said box, and a handle pivotally connected to said brackets and arranged for pivotal movement to a carrying position in which said handle extends over the upper surface of said box.

5. A battery and cable carrier adapted to receive a battery and the cables connected to the terminals of the battery, comprising an open top box adapted to conformably receive a battery with the upper surface of the battery exposed, a combined handle and cable retaining means secured to each of two opposite walls of said box, a handle bracket secured to each of two opposite walls of said box, a handle pivotally connected to said brackets for movement to a carrying position in which the handle extends over the upper surface of said box, and limit means formed integrally with said handle brackets to prevent movement of said handle in one direction from its carrying position.

6. A battery and cable carrier adapted to receive a battery and the cables connected to the terminals of the battery, comprising an open top box adapted to conformably receive a battery with the top of the battery exposed, a combined handle and cable retaining means secured to each end wall of said box, a handle bracket secured to the upper portion of each end wall at the midpoint thereof and having a portion extending above the upper surface of said end wall, a bail having end portions pivotally connected to each of said brackets for movement to a carrying position in which the bail extends above the upper surface of said box and longitudinally thereof, and limit means formed integrally with each of said handle brackets for engagement with said end portions of said bail to prevent movement of said bail in one direction from its carrying position.

7. A battery and cable carrier adapted to receive a battery and the cables connected to the terminals of the battery, comprising an open top box adapted to conformably receive the battery with the top of the battery exposed, a combined handle and cable retaining means secured to each of two opposite walls of said box, a retaining bracket secured to each of two opposite walls of said box for the reception and retention of the free end of each of said battery cables, a handle bracket secured to each of two opposite walls of said box, and a bail pivotally connected to each of said handle brackets for movement to a carrying position in which the bail extends over the upper surface of said box to provide a handle for carrying said box and the battery to be received therein.

8. A battery and cable carrier adapted to receive a battery and the cables connected to the terminals of the battery, comprising an open top box adapted to conformably receive a battery with the upper surface of the battery exposed, a combined handle and cable retaining means secured to each end wall of said box, a cushion for the bottom and lower portions of the walls of said box, a retaining bracket secured to each end wall of said box for the reception and retention of the free ends of the battery cables, a handle bracket secured to each end wall of said box, and a handle pivotally connected to each of said handle brackets for movement to a carrying position in which the handle extends above said box longitudinally thereof.

9. A battery and cable carrier adapted to receive a battery and the cables connected to the terminals of the battery, comprising an open top box adapted to conformably receive a battery with the upper surface of the battery exposed, a combined handle and cable retaining means secured to each end wall of said box, a cushion for the bottom and lower portions of the side walls of said box, a cushion for the upper portion of the walls of said box, a retaining bracket secured to each end wall of said box for the reception and retention of the free ends of the battery cables, a handle bracket secured to each end wall of said box, and a handle pivotally connected to each of said handle brackets for movement to a carrying position in which the handle extends above said box and longitudinally thereof.

10. A battery and cable carrier adapted to receive a battery and the cables connected to the terminals of the battery, comprising an open top box adapted to conformably receive a battery with the upper surface of the battery exposed, a combined handle and cable retaining means secured to each end wall of said box, a cushion for the bottom and the lower portions of the walls of said box, a cushion for the upper portion of the walls of said box, a retaining bracket secured to each end wall of said box for the reception and retention of the free ends of said battery cables, said retaining brackets being each secured to the end wall of said box adjacent the upper surface thereof and adjacent said combined handle and cable retaining means for the reception of the free ends of the cables after the cables have been coiled about the retaining means, a handle bracket secured to the upper portion of each end wall and having a portion extending above the upper surface of said end wall, and a handle having portions pivotally connected to the upwardly extending portions of each of said handle brackets for movement to a carrying position in which the handle extends above and longitudinally of said box, and limit means formed integrally with each of said handle brackets and arranged for engagement with said portions of said handle pivotally connected to said handle brackets for preventing movement of said handle in one direction from said carrying position.

11. A battery and cable carrier adapted to receive a battery and the cables connected to the terminals of the battery, comprising an open top box adapted to conformably receive the battery with the upper surface of the battery exposed, a combined handle and cable retaining means secured to each end wall of said box, a bracket for each battery cable secured to the upper surface of the walls of said box, and a cushion for the bottom and the lower portions of the walls of said box.

12. A battery and cable carrier adapted to receive a battery and the cables connected to the terminals of the battery, comprising an open top box adapted to conformably receive the battery with the upper surface of the battery exposed, a combined handle and cable retaining means secured to each end wall of said box, a cable bracket for each of said battery cables secured in detachable fashion to the upper surface of the walls of said box, and a retaining bracket secured to each end wall of said box for the reception and retention of the free end of the battery cables after the cables have been passed through said cable brackets and coiled around said cable retaining means.

13. A battery cable and carrier adapted to receive a battery and the cables connected to the terminals of the battery, comprising an open top box adapted to conformably receive a battery with the upper surface of the battery exposed, a combined handle and cable retaining means secured to each end wall of said box, a cable bracket for each battery cable detachably secured to the upper surface of one side wall of said box adjacent the battery terminals, a retaining bracket secured to each end wall of said box for the reception and retention of the free end of each battery cable after each cable has been passed through one cable bracket and coiled around one cable retaining means, a handle bracket secured to the upper portion of each end wall and having portions extending thereabove, and a handle having portions pivotally connected to the upwardly extending portions of each handle bracket for movement to a carrying position in which the handle extends above and longitudinally of said box.

14. A battery and cable carrier adapted to receive a battery and the cables connected to the terminals of the battery, the cables terminating in clamps, comprising an open top box adapted to conformably receive a battery with the upper surface of the battery exposed, a combined handle and cable retaining means secured to each end wall of said box, a cable bracket for each battery cable adapted to be secured and to secure the cables to the upper surface of one side wall of said box adjacent the battery terminals, a cushion for the bottom and the lower portions of the walls of said box, a cushion for the upper portion of the walls of said box, a retaining bracket secured to each end wall of said box adjacent said combined handle and cable retaining means and adjacent the upper surface of said end walls, said cushion for the upper portion of the walls of said box extending between the end walls of said box and said retaining brackets, said retaining brackets serving to receive and retain the clamps provided at the free ends of the battery cables after the cables have been passed through said cable brackets and coiled around said cable retaining means, a handle bracket secured to the upper portion of each end wall at the mid-point thereof and having portions extending above the upper surface of the end walls, a handle having end portions pivotally connected to the upwardly extending portions of each of said handle brackets for movement from an at rest position in which the handle engages the upper surfaces of the two end walls and the upper surface of the side wall opposite that to which said cable brackets are secured to a carrying position extending above and longitudinally of said box, and limit means formed integrally with each of said handle brackets for engagement with said end portions of said handle to prevent movement of said handle from its carrying position toward the side wall of said box to which said cable brackets are secured.

LAWRENCE BETZ.

REFERENCES CITED

The following references are of record in the file of this patent:

UNITED STATES PATENTS

| Number | Name | Date |
| --- | --- | --- |
| 1,272,247 | Ford | July 9, 1918 |
| 1,364,358 | Edison | Jan. 4, 1921 |
| 1,514,056 | Leitzen | Nov. 4, 1924 |
| 1,514,670 | Melchior | Nov. 11, 1924 |
| 1,543,017 | Lea | June 23, 1925 |
| 1,840,240 | Ludewig | Jan. 5, 1932 |

FOREIGN PATENTS

| Number | Country | Date |
| --- | --- | --- |
| 917,438 | France | Jan. 7, 1947 |